US006859874B2

(12) United States Patent
Kruckemyer

(10) Patent No.: US 6,859,874 B2
(45) Date of Patent: **\*Feb. 22, 2005**

(54) METHOD FOR IDENTIFYING BASIC BLOCKS WITH CONDITIONAL DELAY SLOT INSTRUCTIONS

(75) Inventor: David A. Kruckemyer, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 598 days.

This patent is subject to a terminal disclaimer.

(21) Appl. No.: 09/961,579

(22) Filed: Sep. 24, 2001

(65) Prior Publication Data

US 2003/0061472 A1 Mar. 27, 2003

(51) Int. Cl.$^7$ ................................................ G06F 9/00
(52) U.S. Cl. ..................................... 712/233; 712/234
(58) Field of Search ................................ 712/219, 233, 712/234, 239

(56) References Cited

U.S. PATENT DOCUMENTS

| | | | | | |
|---|---|---|---|---|---|
| 5,887,161 | A | * | 3/1999 | Cheong et al. | 712/244 |
| 6,032,244 | A | * | 2/2000 | Moudgill | 712/23 |
| 6,260,138 | B1 | * | 7/2001 | Harris | 712/239 |
| 6,289,442 | B1 | * | 9/2001 | Asato | 712/239 |
| 6,725,365 | B1 | * | 4/2004 | Cofler et al. | 712/233 |

OTHER PUBLICATIONS

Heinrich, "MIPS R4000 Microprocessor User's Manual" 2$^{nd}$ Edition. ©1994. Page 41.*
Klauser et al. "Selective Eager Execution on the PolyPath Architecture". ©1998. Pages 1–10.*
Halfhill. "Beyond Pentium II". ©Dec. 1997. Pages 108 http://www.byte.com/art/9712/sec5/art1.htm.*
SiByte, "Target Applications," http://sibyte.com/mercurian/applications.htm, Jan. 15, 2001, 2 pages.
SiByte, "SiByte Technology," http://sibyte.com/mercurian/technology.htm, Jan. 15, 2001, 3 pages.
SiByte, "The Mercurian Processor," http://sibyte.com/mercurian, Jan. 15, 2001, 2 pages.
SiByte, "Fact Sheet," SB–1 CPU, Oct. 2000, rev. 0.1, 1 page.
SiByte, "Fact Sheet," SB–1250, Oct. 2000, rev. 0.2, 10 pages.
Stepanian, SiByte, SiByte SB–1 MIPS64 CPU Core, Embedded Processor Forum 2000, Jun. 13, 2000, 15 pages.
Jim Keller, "The Mercurian Processor: A High Performance, Power–Efficient CMP for Networking," Oct. 10, 2000, 22 pages.
Tom R. Halfhill, "SiByte Reveals 64–Bit Core For NPUs; Independent MIPS64 Design Combines Low Power, High Performance," Microdesign Resources, Jun. 2000, Microprocessor Report, 4 pages.
SiByte, Letter from Anu Sundaresan, May 18, 2000, 1 page.
Gerry Kane and Joe Heinrich, "MIPS RISC Architecture," MIPS Technologies, Inc., 1992, pp. 1–12 to 1–14, 3–19 to 3–21, A–7, A–15 to A–38, A–50 to A–53, and C–6 to C–7.

* cited by examiner

Primary Examiner—Eddie Chan
(74) Attorney, Agent, or Firm—Garlick Harrison & Markison LLP

(57) ABSTRACT

A first tag is assigned to a branch instruction. Dependent on the type of branch instruction, a second tag is assigned to an instruction in the branch delay slot of the branch instruction. If the branch is mispredicted, the first tag is broadcast to pipeline stages that may have speculative instructions, and the first tag is compared to tags in the pipeline stages to determine which instructions to cancel. The assignment of tags for a fetch group of concurrently fetched instructions may be performed in parallel. A plurality of branch sequence numbers may be generated, and one of the plurality may be selected for each instruction responsive to the cumulative number of branch instructions preceding that instruction within the fetch group. The selection may be further responsive to whether or not the instruction is in a conditional delay slot.

29 Claims, 8 Drawing Sheets

| BSN | Instruction |
|---|---|
| N | In0 |
| N | In1 |
| N | In2 |
| N | B1 |
| N | In3 (Delay Slot) |
| N+1 | In4 |
| N+1 | In5 |
| N+1 | In6 |
| N+1 | B2 |
| N+1 | In7 (Delay Slot) |
| N+2 | In8 |

| BSN | Instruction |
|---|---|
| N | In0 |
| N | In1 |
| N | In2 |
| N | BL1 |
| N+1 | In3 (Delay Slot) |
| N+1 | In4 |
| N+1 | In5 |
| N+1 | In6 |
| N+1 | BL2 |
| N+2 | In7 (Delay Slot) |
| N+2 | In8 |

METHOD FOR IDENTIFYING BASIC BLOCKS WITH CONDITIONAL DELAY SLOT INSTRUCTIONS

BACKGROUND OF THE INVENTION

1. Field of the Invention

This invention is related to the field of processors and, more particularly, to the canceling of speculative instructions in response to a branch misprediction.

2. Description of the Related Art

Branch instructions present numerous challenges to processor designers. The existence of branch instructions in code, and the mechanisms that the processor includes to handle the branch instructions with high performance, are frequently large factors in determining the overall performance that a user may actually experience when using a system including the processor.

One mechanism frequently used to address the challenges presented by branch instructions is speculative operation. Generally, branch instructions may be predicted (e.g. taken or not taken, for conditional branches, and/or branch target address predictions, for indirect branches and returns) and speculative operation may be performed based on the prediction. Instructions may be speculatively fetched and processed up to and/or including execution prior to resolution of the predicted branch instruction. If the prediction is correct, performance of the processor may be increased due to the speculative processing of the next instructions to be executed after the branch (either those at the branch target address or the sequential instructions). However, if the prediction is incorrect, the speculative instructions must be cancelled. Canceling the speculative instructions, particularly in wide issue processors, may be complex.

A further difficulty introduced in some instruction set architectures (e.g. the MIPS instruction set architecture) involves the branch delay slot. The instruction in the branch delay slot is typically executed irrespective of whether the branch instruction is taken or not taken. However, for some branch instructions, the instruction in the branch delay slot is architecturally defined to be conditional based on whether the corresponding branch is taken or not taken. If the branch is taken, the instruction in the branch delay slot is executed. If the branch is not taken, the instruction in the branch delay slot is not executed. Thus, the branch delay slot instruction is treated differently for different branches, further complicating the canceling of speculative instructions. Any type of instruction may be in the branch delay slot, and thus locating the instruction and canceling or not canceling the instruction based on which branch instruction that instruction follows is complicated.

SUMMARY OF THE INVENTION

A processor implements a mechanism for handling instruction cancellation for mispredicted branch instructions. Particularly, a first tag (referred to herein in certain exemplary embodiments as a branch sequence number) is assigned to a branch instruction. Dependent on the type of branch instruction, a second tag is assigned to an instruction in the branch delay slot of the branch instruction. The second tag may equal the first tag if the branch delay slot is unconditional for that branch, and may equal a different tag if the branch delay slot is conditional for the branch. If the branch is mispredicted, the first tag is broadcast to pipeline stages that may have speculative instructions, and the first tag is compared to tags in the pipeline stages. If the tag in a pipeline stage matches the first tag, the instruction is not cancelled. If the tag mismatches, the instruction is cancelled. Thus, an instruction in the unconditional delay slot is not cancelled (since the second tag equals the first tag for the unconditional delay slot) and an instruction in the conditional delay slot is cancelled (since the second tag equals a different tag). The cancellation mechanism thus may not require special handling of the branch delay slot during cancellation . . . the assignment of the tag may ensure the proper cancellation or non-cancellation of the branch delay slot instruction.

In one embodiment, the assignment of tags for a fetch group of concurrently fetched instructions may be performed in parallel. A plurality of branch sequence numbers may be generated, and one of the plurality may be selected for each instruction responsive to the cumulative number of branch instructions preceding that instruction within the fetch group. In embodiments having the conditional delay slot, the selection may be further responsive to whether or not the instruction is in a conditional delay slot.

BRIEF DESCRIPTION OF THE DRAWINGS

The following detailed description makes reference to the accompanying drawings, which are now briefly described.

Figure 1:
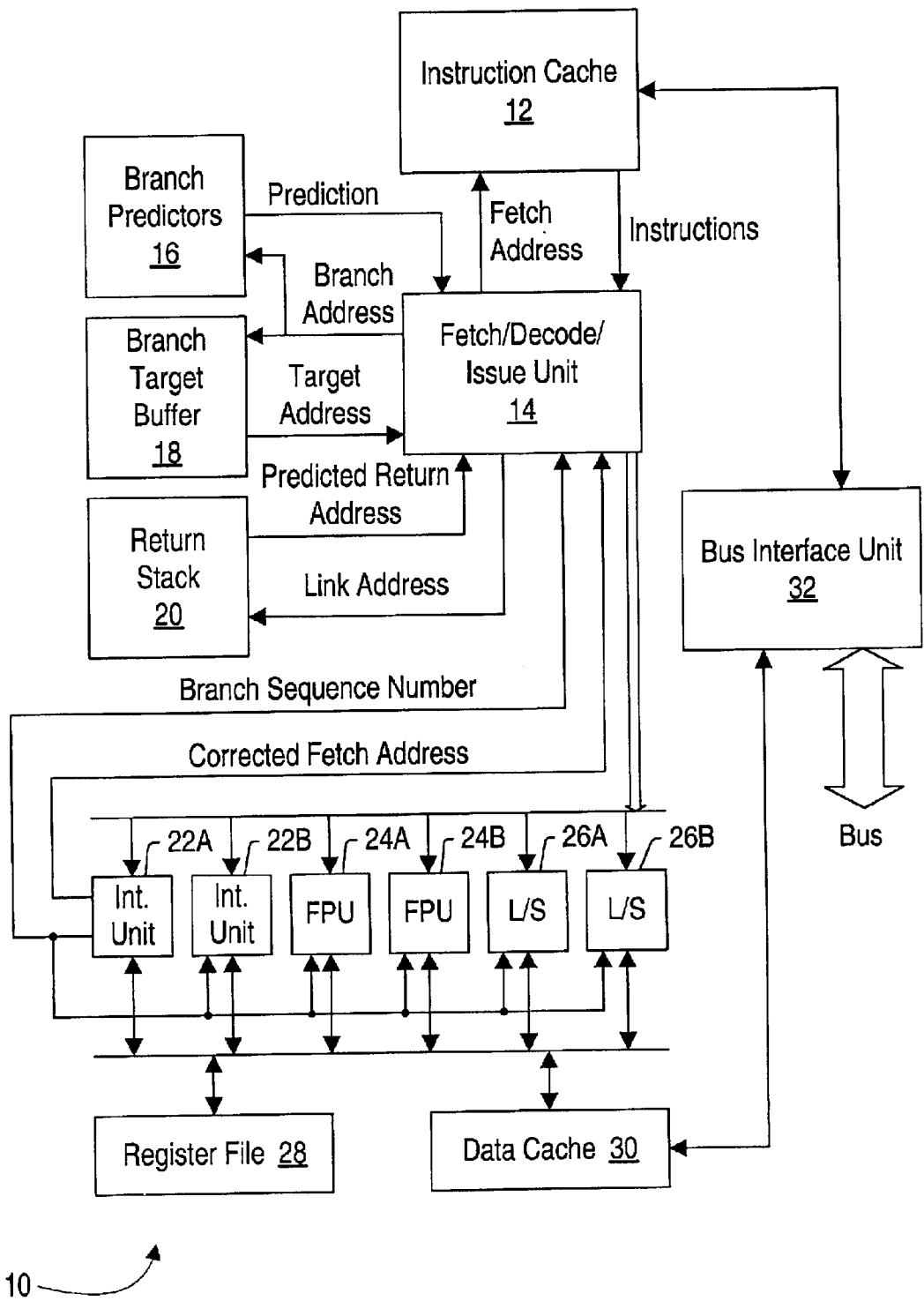
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Processor Overview

Turning now to FIG. 1, a block diagram of one embodiment of a processor 10 is shown. Other embodiments are possible and contemplated. In the embodiment of FIG. 1, the processor 10 includes an instruction cache 12, a fetch/ decode/issue unit 14, a branch predictors unit 16, a branch target buffer 18, a return stack 20, a set of integer execution units 22A–22B, a set of floating point execution units 24A–24B, a set of load/store execution units 26A–26B, a register file 28, a data cache 30, and a bus interface unit 32. The instruction cache 12 is coupled to the bus interface unit 32, and is coupled to receive a fetch address from, and provide corresponding instructions to, the fetch/decode/issue unit 14. The fetch/decode/issue unit 14 is further coupled to the branch predictors 16, the branch target buffer 18, the return stack 20, and the execution units 22A–22B, 24A–24B, and 26A–26B. Specifically, the fetch/decode/issue unit 14 is coupled to provide a branch address to the branch predictors 16 and the branch target buffer 18, and to receive a prediction from the branch predictors 16 and a target address from the branch target buffer 18. The fetch/decode/issue unit 14 is coupled to provide a link address to the return stack 20 and to receive a predicted return address from the return stack 20. The fetch/decode/issue unit 14 is coupled to provide instructions for execution to the execution units 22A–22B, 24A–24B, and 26A–26B and to receive a corrected fetch address and corresponding branch sequence number from the integer execution unit 22A. The execution units 22A–22B, 24A–24B, and 26A–26B are generally coupled to the register file 28 and the data cache 30, and the data cache 30 is coupled to the bus interface unit 32.

Generally speaking, the fetch/decode/issue unit 14 is configured to generate fetch addresses for the instruction cache 12 and to receive corresponding instructions therefrom. The fetch/decode/issue unit 14 uses branch prediction information to generate the fetch addresses, to allow for speculative fetching of instructions prior to execution of the corresponding branch instructions. Specifically, in the illustrated embodiment, the fetch/decode/issue unit 14 may provide a branch address of the branch instruction to be predicted to the branch predictors 16 and the branch target buffer 18. The branch predictors 16 may be an array of branch predictors indexed by the branch address. A prediction is generated from the selected branch predictor and provided to the fetch/decode/issue unit 14 (e.g. the typical two bit counters which are incremented when the corresponding branch is taken, saturating at 11 in binary, and decremented when the corresponding branch is not taken, saturating at 00 in binary, with the most significant bit indicating taken or not taken). The fetch/decode/issue unit 14 may use the branch prediction to select the next fetch address as either the target address or the sequential address of a conditional branch instruction. While any size and configuration may be used, one implementation of the branch predictors 16 may be 4 k entries in a direct-mapped configuration. The branch target buffer 18 may be an array of branch target addresses. The target addresses may be previously generated target addresses of any type of branch, or just those of indirect branches. Again, while any configuration may be used, one implementation may provide 64 entries in the branch target buffer 18. Still further, the return stack 20 may be used to store link addresses of branch instructions which update a link resource ("branch and link" instructions). Such branch and link instructions may be used as procedure calls, and the corresponding return which terminates the called procedure may use the stored link address to return to the next instruction after the procedure call. The fetch/decode/issue unit 14 may provide link addresses when branch instructions which update the link register are fetched for pushing on the return stack 20, and the return stack 20 may provide the address from the top entry of the return stack 20 as a predicted return address. The predicted return address may be selected as the next fetch address if a return is detected by the fetch/decode/issue unit 14. While any configuration may be used, one implementation may provide 8 entries in the return stack 20.

The fetch/decode/issue unit 14 decodes the fetched instructions and queues them in one or more instruction queues for issue to the appropriate execution units. The instructions may be speculatively issued to the appropriate execution units, again prior to execution/resolution of the branch instructions which cause the instructions to be speculative. In some embodiments, out of order execution may be employed (e.g. instructions may be issued in a different order than the program order). In other embodiments, in order execution may be used. However, some speculative issue/execution may still occur between the time that a branch instruction is issued and its result is generated from the execution unit which executes that branch instruction (e.g. the execution unit may have more than one pipeline stage).

The integer execution units 22A–22B are generally capable of handling integer arithmetic/logic operations, shifts, rotates, etc. At least the integer execution unit 22A is configured to execute branch instructions, and in some embodiments both of the integer execution units 22A–22B may handle branch instructions. In one implementation, only the execution unit 22B executes integer multiply and divide instructions although both may handle such instructions in other embodiments. The floating point execution units 24A–24B similarly execute the floating point instructions. The integer and floating point execution units 22A–22B and 24A–24B may read and write operands to and from the register file 28 in the illustrated embodiment, which may include both integer and floating point registers. The load/store units 26A–26B may generate load/store addresses in response to load/store instructions and perform cache accesses to read and write memory locations through the data cache 30 (and through the bus interface unit 32, as needed), transferring data to and from the registers in the register file 28 as well.

The instruction cache 12 may have any suitable configuration and size, including direct mapped, fully associative, and set associative configurations. Similarly, the data cache 30 may have any suitable configuration and size, including any of the above mentioned configurations. In one implementation, each of the instruction cache 12 and the data cache 30 may be 4 way set associative, 32 kilobyte (kb) caches including 32 byte cache lines. Both the instruction cache 12 and the data cache 30 are coupled to the bus interface unit 32 for transferring instructions and data into and out of the caches in response to misses, flushes, coherency activity on the bus, etc.

In one implementation, the processor 10 is designed to the MIPS instruction set architecture (including the MIPS-3D and MIPS MDMX application specific extensions). The MIPS instruction set may be used below as a specific example of certain instructions. However, other embodiments may implement the IA-32 or IA-64 instruction set architectures developed by Intel Corp., the PowerPC instruction set architecture, the Alpha instruction set architecture, the ARM instruction set architecture, or any other instruction set architecture.

It is noted that, while FIG. 1 illustrates two integer execution units, two floating point execution units, and two load/store units, other embodiments may employ any number of each type of unit, and the number of one type may differ from the number of another type.

Conditional Branch Delay Slot Handling—Overview

The processor 10 may employ branch sequence numbers for handling speculative processing and the conditional branch delay slot. As used herein, the term "branch delay slot" refers to the next sequential instruction location after a particular branch instruction in program order.

For some types of branch instructions, the instruction in the branch delay slot is executed unconditionally. In other words, regardless of whether or not the branch instruction is taken, the instruction in the branch delay slot is executed. The next instruction to be executed after the instruction in the branch delay slot is either the instruction at the target address of the branch instruction (if the branch instruction is taken) or the instruction sequential to the branch delay slot (if the branch instruction is not taken). For other types of branch instructions, the branch delay slot may be conditional. If the branch instruction is taken, the instruction in the branch delay slot is executed (followed by the instruction at the target address of the branch instruction). If the branch instruction is not taken, the instruction in the branch delay slot is nullified (and the next instruction to be executed is the instruction sequential to the branch delay slot).

The processor 10 may assign a first branch sequence number to the branch instruction, and may assign a second branch sequence number to the instruction in the branch delay slot. Depending upon the type of branch instruction, the second branch sequence number may be either equal to the first branch sequence number (if the delay slot is unconditional) or a different branch sequence number (if the delay slot is conditional). If the branch instruction is mispredicted, the branch sequence number of the branch instruction may be broadcast to pipeline stages that may have speculative instructions in them. If the branch sequence number of an instruction matches that of the branch instruction, then the instruction is not cancelled and processing may continue. Thus, the unconditional delay slot instruction is not cancelled. If the branch sequence number of the instruction does not match that of the branch instruction, then the instruction is cancelled. Thus, the conditional delay slot instruction is cancelled.

Accordingly, the conditional/unconditional delay slot special case is handled in the assignment of branch sequence numbers. Special logic to locate the delay slot instruction and to cancel or not cancel the instruction based on the type of branch instruction may not be required. As used herein, the term "cancel", when referring to an instruction, means ensuring that the instruction does not update architected state of the processor. Any mechanism for canceling the instruction may be used. For example, state carried with the instruction in the pipeline may be altered to indicate that no update should be performed but the instruction may continue through the pipeline and exit the pipeline like any other instruction. Alternatively, processing of the instruction in the pipeline may cease and a bubble in the pipeline may be introduced where the instruction was (or the bubble may be squashed). Any combination of mechanisms for canceling may be employed as well, as desired.

The same mechanism may further be used to cancel other speculative instructions. Generally, the processor 10 may assign the same branch sequence number to each instruction within a basic block terminated by a branch instruction, and may change the branch sequence number in response to the branch instruction (e.g. the branch sequence number may be incremented). The different branch sequence number mentioned above for the conditional delay slot may be the branch sequence number after it has been changed in response to the branch instruction. Subsequent instructions may be assigned the incremented branch sequence number until another branch instruction is detected, terminating another basic block. Thus, the branch sequence number of a branch instruction matches the branch sequence number of instructions within its basic block and differs from the branch sequence number of instructions in other basic blocks.

As used herein, the term "basic block" refers to the group of instructions which are guaranteed to execute (notwithstanding an exception) once a particular branch instruction is resolved as either taken or not taken. Thus, basic blocks are terminated by branch instructions, and a branch instruction may define the beginning of another basic block at its target address and at its sequential address (including or not including the branch delay slot, depending on the type of branch instruction).

In one embodiment, the processor 10 employs the MIPS instruction set architecture. In such an embodiment, the type of branch instruction which indicates a conditional delay slot is the "branch likely" type. Branch likely instructions are used as a hint to the processor 10 that the branch is likely to be taken. For example, branch instructions used to form a loop may be branch likely instructions, since they are taken on each iteration of the loop other than the last iteration of the loop. The processor 10 may, in general, predict the branch likely instructions taken. Other types of branches in the MIPS instruction set may indicate an unconditional delay slot. Other embodiments may employ different types of branches indicating the conditional or unconditional delay slot. Generally, the "type" of a branch is a classification of the branch instruction into one of at least two groups of branch instructions, where at least one of the groups indicates a conditional branch delay slot and the remaining groups indicate an unconditional delay slot. Any classification of branches may be used.

Figure 2:
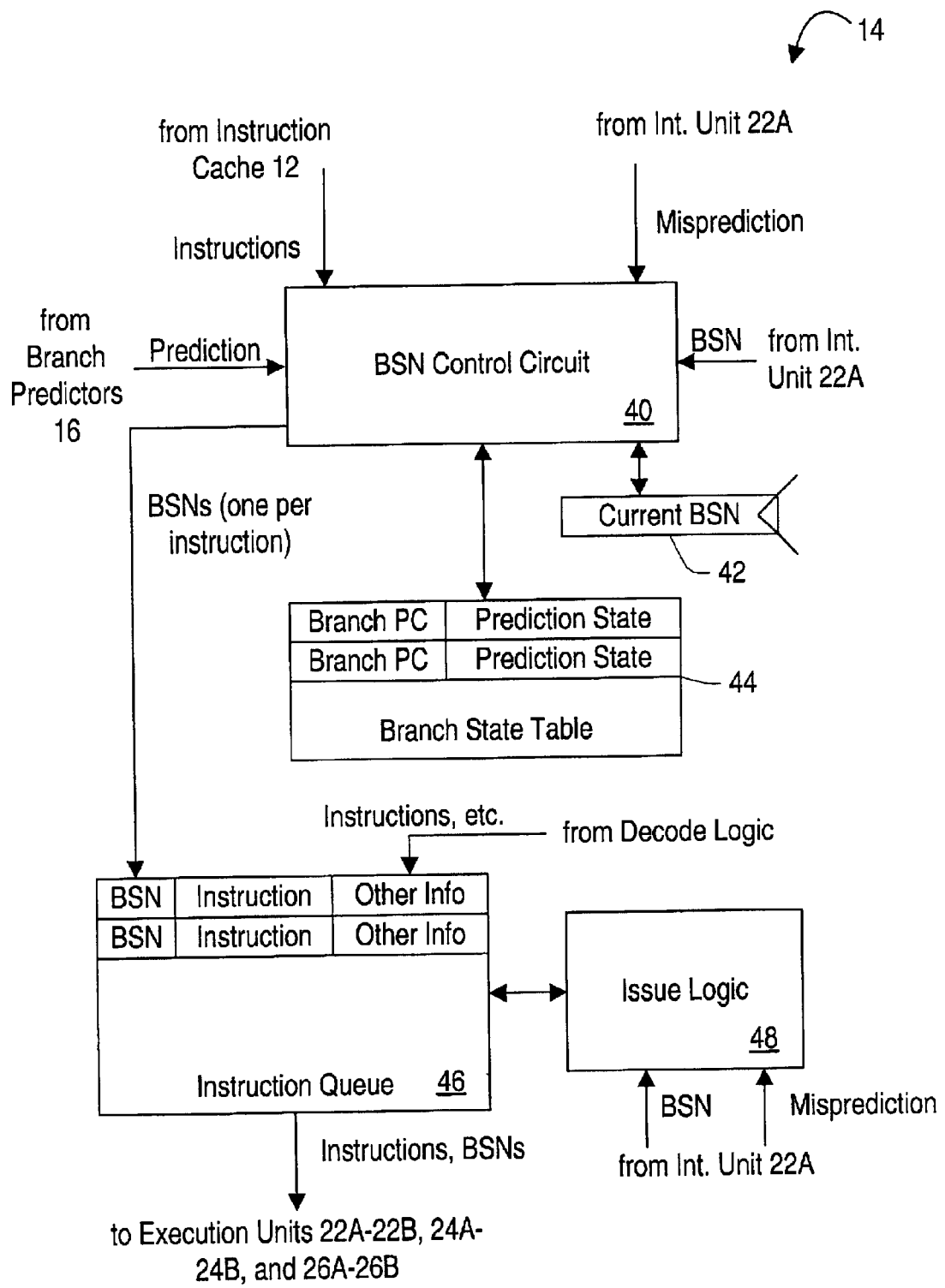
FIG. 2 is a block diagram of a portion of one embodiment of a fetch/decode/issue unit shown in FIG. 1.

Turning now to FIG. 2, a block diagram of one embodiment of a portion of the fetch/decode/issue unit 14 is shown. Other embodiments are possible and contemplated. In the embodiment of FIG. 2, the portion of the fetch/decode/issue unit 14 includes a branch sequence number (BSN) control circuit 40, a current BSN register 42, a branch state table 44, an instruction queue 46, and an issue logic circuit 48. The BSN control circuit 40 is coupled to the current BSN register 42, the branch state table 44, and the instruction queue 46. Additionally, the BSN control circuit 40 is coupled to receive the BSN and a misprediction signal from the integer execution unit 22A, instructions from the instruction cache 12, and prediction information from the branch predictors 16. The instruction queue 46 is further coupled to receive instructions and other information from the decode logic within the fetch/decode/issue unit 14 (not shown) and is coupled to the issue logic circuit 48, which is also coupled to receive the BSN and the misprediction signal from the integer execution unit 22A. The issue queue 46 is coupled to provide issued instructions and corresponding BSNs to the execution units 22A–22B, 24A–24B, and 26A–26B.

Generally, the BSN control circuit 40 is configured to receive instructions fetched from the instruction cache 12 and to assign BSNs to those instructions. A BSN is assigned to each instruction, and provided to the instruction queue 46 for storage. Separately, the instructions may be provided to the decode logic for decoding, and the instructions and other information generated by the decode logic may be provided to the instruction queue 46 for storage as well. The BSN control circuit 40 scans the instructions to locate branches, and assigns either the current BSN (stored in the current BSN register 42), the current BSN+1, or the current BSN+2 (in one embodiment) to each instruction based on whether or not a branch instruction is detected and the type of branch instruction. Additional details regarding the assignment of BSNs to an instruction are provided below in the flowchart of FIG. 3. Furthermore, additional details regarding the parallel assignment of BSNs to multiple concurrently fetched instructions (where the current BSN may differ between the concurrently fetched instructions) are provided below in FIGS. 9 and 10.

The BSN control circuit 40 is configured to update the current BSN based on the instructions processed. In one embodiment, the BSN control circuit 40 processes a plurality of concurrently fetched instructions in parallel. The plurality of concurrently fetched instructions may include multiple branch instructions. However, if one branch instruction is predicted taken, the remaining branch instructions may be cancelled (and the target of the predicted taken branch may be fetched). Accordingly, updating the current BSN may be affected by branch predictions for the branch instructions within the plurality of concurrently fetched instructions. In one specific embodiment, four concurrently fetched instructions are processed in parallel and the branch prediction for the first instruction of the concurrently fetched instructions (if a branch instruction) is used in updating the current BSN.

In the illustrated embodiment, the BSN may also be used to identify an entry in the branch state table 44 assigned to a given branch instruction. Generally, the branch state table 44 may be used to store various information used in predicting the branch instruction, to allow for prediction update when the branch instruction is resolved. The BSN may include relatively few bits as compared to the information stored in an entry of the branch state table 44, and thus the smaller BSN may be more easily transmitted with the branch instruction through the pipeline of the processor 10. As illustrated in FIG. 2, the branch PC (or a portion thereof) may be stored, since that value may be used to locate information in the branch predictors 16 or the branch target buffer 18, as well as other prediction state. History information may also be used to locate the information in the branch predictors 16 or the branch target buffer 18, and the history information may be stored as well. Alternatively, the value actually used to index each storage may be stored. Furthermore, the information read from the branch predictors 16 or the branch target buffer 18 may be stored (e.g. the prediction counters, predicted target address, etc.). Information regarding the type of branch may also be stored. Generally, any information that may be used to update branch predictors 16, the branch target buffer 18, the return stack 20, etc. in response to correct prediction or misprediction may be used. The information to be stored may be provided from any number of sources (not shown).

If a misprediction is detected, the integer execution unit 22A asserts the misprediction signal and provides the corresponding BSN to the BSN control circuit 40. The BSN control circuit 40 may read the entry of the branch state table 44 indicated by the BSN and provide the information to prediction correction logic (not shown) which may update the branch prediction information (e.g. the information stored in the branch predictors 16 and/or the branch target buffer 18) to reflect the actual execution of the branch instruction. It is noted that the BSN and the misprediction signal from the integer execution unit 22A may be directly connected to the branch state table 44 for reading the entry corresponding to the mispredicted branch instruction.

Figure 3:
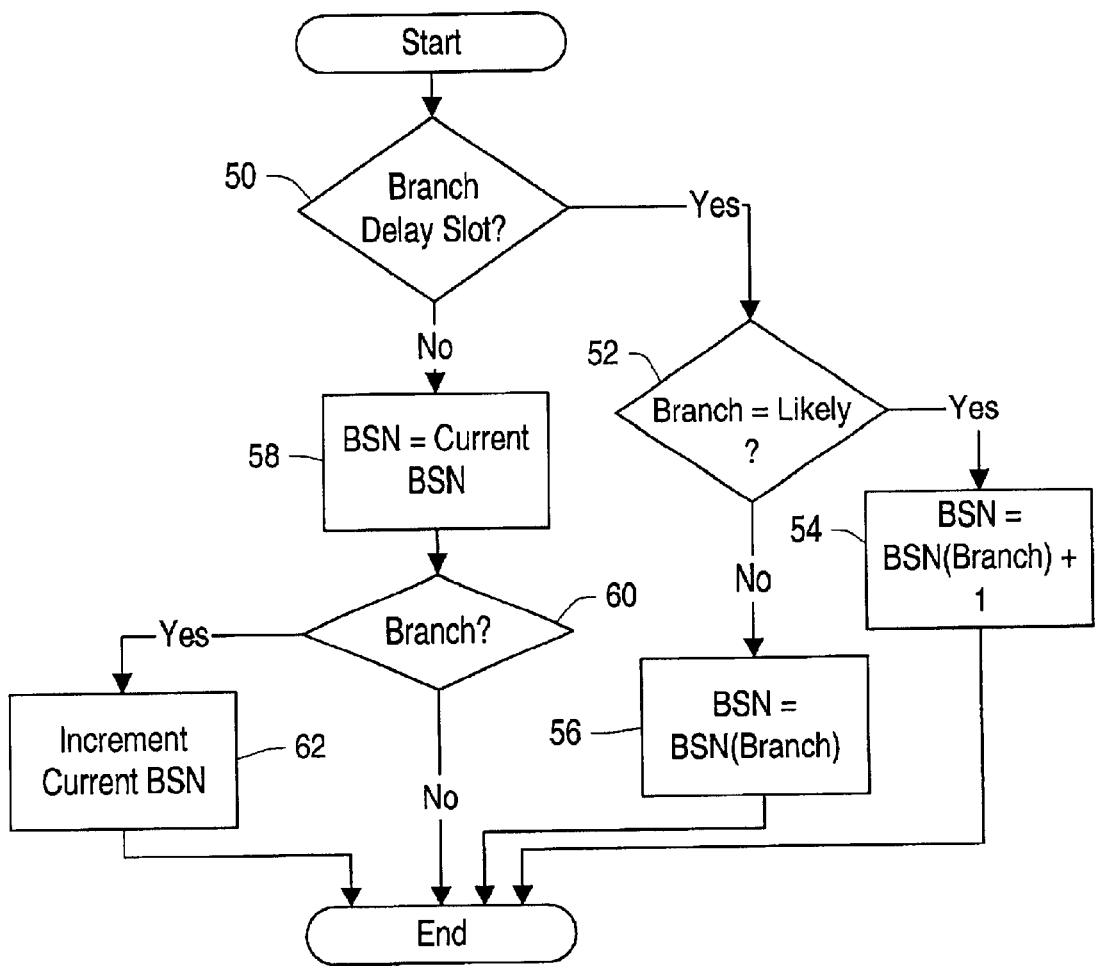
FIG. 3 is a flowchart illustrating operation of one embodiment of a control circuit shown in FIG. 2.

While the embodiment shown in FIG. 2 uses the BSN as an indication of the entry in the branch state table 44 in addition to assigning it to instructions to identify instructions for cancellation when a misprediction is detected, other embodiments may not employ the branch state table 44. In such embodiments, the BSN control circuit 40 may assign BSNs for cancellation purposes only, and may perform the BSN assignment as illustrated in FIG. 3 below. Generally, the BSN control circuit 40 may operate on instructions at any point in the pipeline of the processor 10 which is prior to issue of the instructions for execution. In the illustrated embodiment, the BSN control circuit 40 operates during the decode stage of the pipeline, but can operate at any stage subsequent to fetch of the instructions. Particularly, in the illustrated embodiment, the BSN control circuit 40 operates prior to queuing of the instructions in the instruction queue 46. The instruction queue 46 may be viewed as part of the pipeline of the processor 10 (in addition to the stages shown in FIG. 5 below). As used herein, the term "pipeline" refers to a circuit arrangement in which an instruction is passed through multiple pipeline stages, each of which is assigned a portion of the processing required to perform the operations specified by that instruction. Generally, the pipeline includes fetching the instruction, decoding the instruction, issuing the instruction for execution, reading the operands of the instruction, executing the instruction, and storing the results. One or more of these operations may occur in the same pipeline stage, and any of these operations may be performed over multiple pipeline stages, as desired.

In addition to reporting mispredictions, the integer execution unit 22A may report BSNs of branch instructions which are correctly predicted to free the BSN (and the branch state table 44 entry, in embodiments supporting the branch state table 44) for subsequent branch instructions.

Generally, the instruction queue 46 stores instructions until they can be issued to an appropriate execution unit for execution. The instructions are stored, as well as the BSNs assigned by the BSN control circuit 40 and other information provided by the decode logic. Included in the other information may be, for example, dependency information indicating on which earlier instructions in the instruction queue 46 a particular instruction depends, what operands are used, etc. The issue logic circuit 48 may use such information to determine when an instruction is ready to be issued. In one embodiment, instructions are issued in program order but speculatively. Thus, an instruction is ready for issue if: (i) the instructions prior to that instruction in the instruction queue 46 have been issued or are being issued; and (ii) that instruction is otherwise ready for issue (its operands are available, etc.). Other embodiments may employ out of order issue, as desired. If an instruction is selected for issue, the issue logic reads the corresponding entry storing that instruction and routes the instruction, the corresponding BSN, and any other information that may be useful for execution to the execution unit 22A–22B, 24A–24B, or 26A–26B selected to execute that instruction. In one embodiment, up to four instructions may be issued per clock cycle, with at most one instruction being issued to a given execution unit 22A–22B, 24A–24B, and 26A–26B. Other embodiments may concurrently issue more or fewer instructions. As used herein, the term "issue" refers to transmitting an instruction to an execution unit for execution.

The issue logic circuit 48 may also receive the BSN of a mispredicted branch instruction from the integer execution unit 22A. In an in-order embodiment, most of the instructions in the instruction queue 46 are cancelled in response to a mispredicted branch. However, the oldest instruction in the instruction queue 46 may be the instruction in the branch delay slot corresponding to the mispredicted branch instruction. Thus, the issue logic circuit 48 may compare the BSN of the mispredicted branch to the BSN of the oldest instruction in the instruction queue for possible cancellation.

It is noted that, while the embodiment of the BSN control circuit 40 illustrated in FIG. 2 scans the instructions from instruction cache 12 to perform BSN assignment, other embodiments may scan other information. For example, the instruction cache 12 may store predecode data indicative of the instructions stored therein, and the predecode data may be provided for scanning. The predecode data may identify, for example, the branch instructions within a group of instruction bytes fetched from the instruction cache 12 as well as the type of branch instruction. Still further, data stored in branch prediction structures could be used to identify branches and/or branch type. In yet another alternative, signals indicating which instructions are valid, which are branch instructions, and the type of the branch instructions may be provided from the decode logic, not shown.

Turning next to FIG. 3, a flowchart is shown illustrating operation of one embodiment of the BSN control circuit 40 for assigning a BSN to an instruction. Other embodiments are possible and contemplated. While the blocks shown in FIG. 3 are illustrated in a particular order for ease of understanding, any suitable order may be used. Furthermore, blocks may be performed in parallel in combinatorial logic circuitry within the BSN control circuit 40. Alternatively, some blocks may be performed in different clock cycles than other blocks.

The BSN control circuit 40 determines if the instruction is in the branch delay slot (decision block 50). In other words, the BSN control circuit 40 determines if the preceding instruction, in program order, is a branch instruction. If the instruction is in the branch delay slot, and the branch instruction is a branch likely (decision block 52), the BSN control circuit 40 assigns the BSN of the instruction to be equal to the BSN of the branch instruction plus one (block 54). If the instruction is in the branch delay slot, and the branch instruction is not a branch likely (decision block 52), the BSN control circuit 40 assigns the BSN of the instruction to be equal to the BSN of the branch instruction (block 56). The BSN of the branch instruction may be the current BSN, if the branch instruction and the instruction in the branch delay slot are fetched concurrently, or may be the current BSN-1, if the branch instruction is fetched during a clock cycle prior to the clock cycle in which the instruction in the branch delay slot is fetched. For the situation in which the branch instruction and the instruction in the branch delay slot are fetched on different clock cycles, the BSN control circuit 40 may retain an indication of whether or not the branch was a branch likely or may precalculate the BSN for the instruction in the delay slot (e.g. according to blocks 50–56) and retain the BSN for assignment to the instruction in the branch delay slot during the next clock cycle.

On the other hand, if the instruction is not in the branch delay slot of a branch instruction, the BSN control circuit 40 assigns the BSN of the instruction to be equal to the current BSN (block 58). Additionally, if the instruction is a branch instruction (decision block 60), the BSN control circuit 40 increments the current BSN (block 62).

The flowchart of FIG. 3 illustrates the operation of the BSN control circuit 40 in response to one instruction. However, multiple instructions may be fetched concurrently. For example, in one embodiment, a fetch group of 16 bytes (4 MIPS instructions) may be implemented and thus up to four instructions may be fetched concurrently. The BSN control circuit 40 may generally perform the operation illustrated by the flowchart of FIG. 3 in parallel for each instruction, except that the current BSN shown in block 62 may be the current BSN from the current BSN register 42 as modified in response to any preceding branch instructions within the fetch group.

It is noted that a particular BSN assigned to a branch instruction is not reused for another branch instruction until that branch instruction is resolved. Thus, the BSN control circuit 40 may include circuitry for detecting that all BSNs are currently assigned to in-flight instructions and for stalling instructions until a BSN becomes available.

Figure 4:
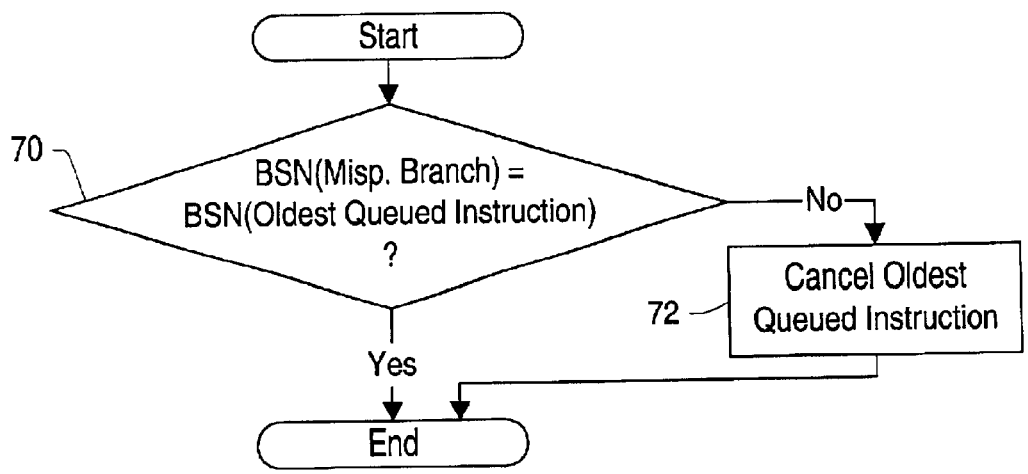
FIG. 4 is a flowchart illustrating operation of one embodiment of an instruction queue shown in FIG. 2.

Turning now to FIG. 4, a flowchart is shown illustrating operation of one embodiment of the issue logic circuit 48 in response to receiving a BSN for a mispredicted branch instruction. Other embodiments are possible and contemplated.

The issue logic circuit 48 compares the BSN of the mispredicted branch to the BSN of the oldest instruction in the instruction queue 46. If the BSNs match (decision block 70), then the instruction is an unconditional branch delay slot instruction and should not be cancelled. If the BSNs do not match, then the instruction is either a conditional branch delay slot instruction and thus should be cancelled (since the branch likely was predicted taken and is mispredicted) or the instruction is another instruction subsequent to the branch instruction and thus is to be cancelled (block 72). As mentioned above, the other instructions in the instruction queue 46 may be cancelled in response to a misprediction.

In one embodiment, the instruction queue 46 may be implemented as a shifting structure in which instructions are shifted down as older instructions are issued. In such a structure, the oldest instruction is always in the same entry of the instruction queue 46 and the issue logic circuit 48 may include a comparator coupled to this entry and to receive the BSN from the integer execution unit 22A to perform the comparison illustrated by decision block 70. On the other hand, the instruction queue 46 may be a circular buffer in which the instructions are allocated entries in the instruction queue 46 and remain in those entries until issued. A pointer may indicate the oldest instruction in the instruction queue 46, and the BSN may be read from the indicated entry for input to a comparator to perform the comparison illustrated by decision block 70.

Figure 5:
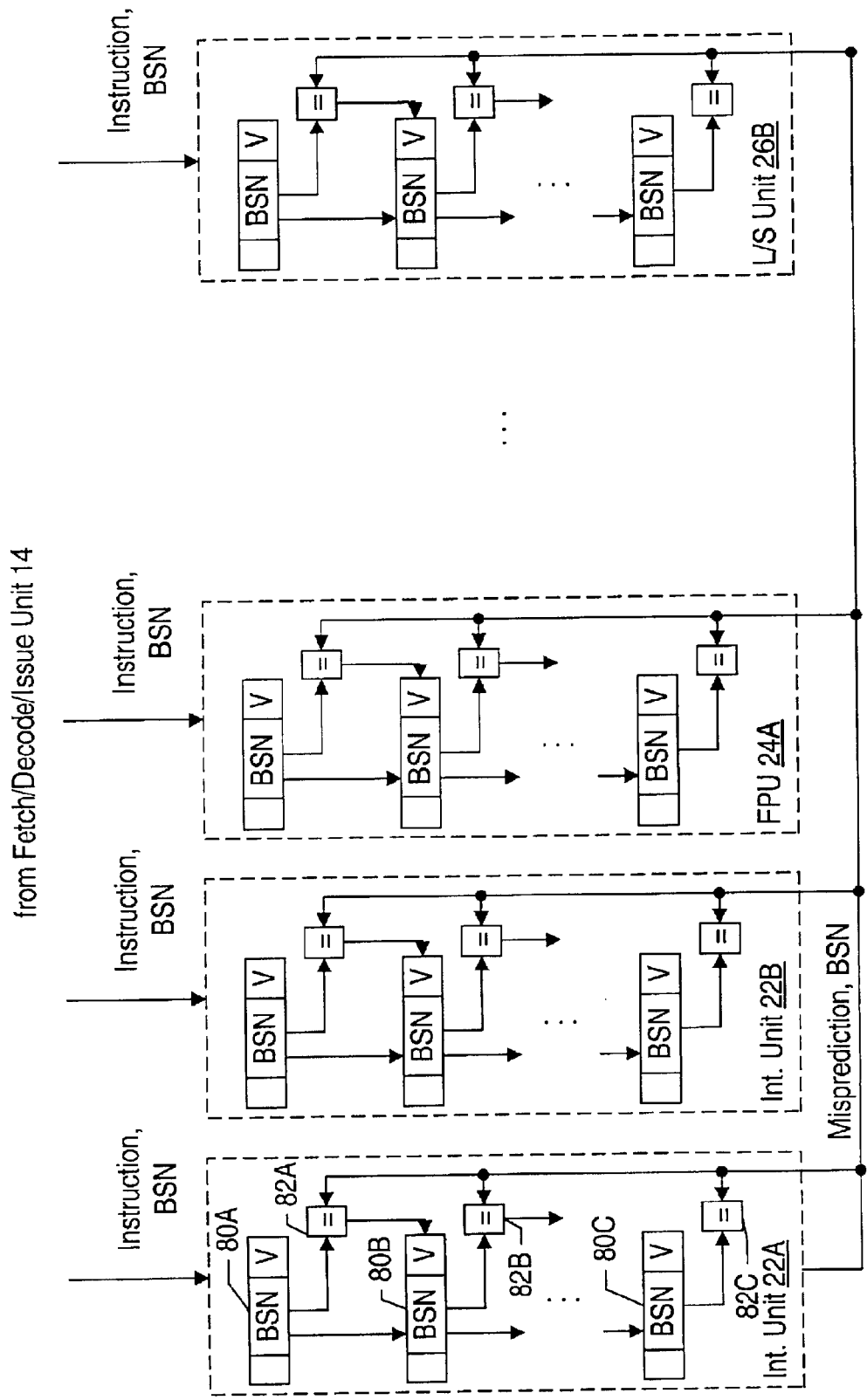
FIG. 5 is a block diagram of one embodiment of pipelines within execution units shown in FIG. 1.

Turning next to FIG. 5, a block diagram of one embodiment of the execution units 22A–22B, 24A, and 26B is shown. The execution units 24B and 26A may be similar to the corresponding execution units 24A and 26B shown in FIG. 5. Other embodiments are possible and contemplated. In the embodiment of FIG. 5, each execution unit is shown as including multiple pipeline stages (e.g. stages 80A–80C in the integer execution unit 22A). Each execution unit is coupled to receive an instruction and corresponding BSN from the fetch/decode/issue unit 14 (e.g. from the instruction queue 46 for the embodiment shown in FIG. 2). Each pipeline stage stores an instruction (as well as any other related information that may be generated or used within the pipeline), the BSN for the instruction, and a valid bit indicating whether or not an instruction is present in that stage. Only the BSN and the valid bit are illustrated as fields in FIG. 5. Each of the pipeline stages is coupled to another stage (or to provide an output, if the stage is the last stage in the pipeline). Additionally, the BSN field of the stage is coupled to a respective comparator (e.g. comparators 82A–82C corresponding to stages 80A–80C in the integer execution unit 22A). The comparators 82A–82C are further coupled to receive the BSN corresponding to a mispredicted branch instruction from the integer execution unit 22A. The misprediction signal may also be received to enable the comparison. The output of each comparator is coupled to the respective valid bit of the following stage (e.g. comparator 82A is coupled to provide an output to the valid bit of stage 80B).

Generally, the pipeline stages illustrated in FIG. 5 may be part of the pipeline of the processor 10. Each stage may operate on a different instruction concurrently (e.g. the stage 80A may be operating on a different integer instruction than stage 80B, etc.). The circuitry forming each stage, which does the work assigned to the stage, is omitted for simplicity in FIG. 5. The number of stages in each type of unit may vary and may differ from the number of stages in the other types of units. For example, in one implementation, the integer execution units 22A–22B include five pipeline stages, the floating point execution units 24A–24B include eight stages, and the load/store units 26A–26B include four stages.

When the integer execution unit 22A detects a mispredicted branch instruction, the integer execution unit 22A outputs the BSN of the mispredicted branch and asserts the misprediction signal. Each of the comparators at each of the pipeline stages of the execution units compares the BSN of the instruction therein to the BSN of the mispredicted branch instruction. If the BSNs match, then the instruction in that stage is in the basic block terminated by the branch and thus is not cancelled. The output of the comparator is a one, which does not clear the valid bit as the instruction moves to the next stage. To prevent validating a stage which does not store an instruction, the output of the comparator may be logically ANDed with the current state of the valid bit. If the BSNs do not match, then the instruction in that stage is in a subsequent basic block (for embodiments employing in-order issue) and thus the instruction is cancelled. The output of the comparator is a zero, which may clear the valid bit as the instruction moves to the next stage. Since the instruction is invalidated, the execution units may not update any architected state in response to the instruction (e.g. the instruction appears to be a bubble in the pipeline).

It is noted that, for in-order embodiments, a comparison of less than the full BSN may be used. Only enough of the BSN need be compared to accurately distinguish among the number of basic blocks which may be outstanding between issuance and writeback of results or evaluation of the branch instruction. For example, in an embodiment in which the integer execution unit 22A outputs a misprediction indication from the fourth stage of its pipeline, up to four branch instructions (one in each of the first four stages of the integer execution unit 22A's pipeline) may be outstanding and thus four unique BSNs may be outstanding, plus a BSN for the basic block following the most recent of the four branch instructions. The BSNs are in numerically increasing order (again due to the in-order issuance of instructions). However, other sorts of assignments may be used (e.g. gray coding) in other embodiments. Accordingly, the least significant three bits of the BSN may be used in the comparisons within the execution units and for the oldest instruction in the instruction queue 46. However, additional BSNs may be outstanding within the instruction queue 46 at any given time, and thus it may be desirable for the BSN control circuit 40 and the instruction queue 46 to support BSNs in excess of three bits so that stalling due to a lack of available BSNs is infrequent. For example, four bits of BSN may be implemented, in one embodiment.

Figures 6, 7, 8:
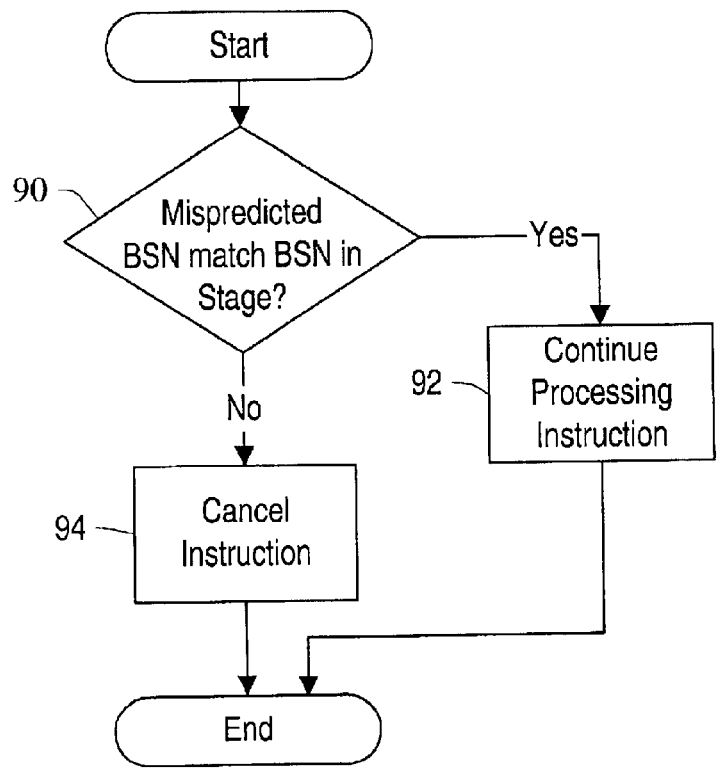
FIG. 6 is a flowchart illustrating operation of one embodiment of the pipelines shown in FIG. 5.
FIG. 7 is an example instruction sequence with corresponding branch sequence numbers.
FIG. 8 is a second example instruction sequence with corresponding branch sequence numbers.

Turning now to FIG. 6, a flowchart is shown illustrating operation of a pipeline stage in response to a BSN corresponding to a mispredicted branch instruction is shown. Other embodiments are possible and contemplated.

If the BSN corresponding to the mispredicted branch instruction matches the BSN in the stage (decision block 90), the stage continues processing of the instruction therein (block 92). If the BSNs do not match, the instruction is cancelled (block 94). For the embodiment of FIG. 5, the instruction is cancelled by resetting the valid bit corresponding to the instruction. Other embodiments may use any cancellation method, as described above.

It is noted that, while some embodiments of the processor 10 described above may employ in-order issue, other embodiments may employ out of order issue. In such embodiments, the BSN comparisons may be a greater-than/less-than compare rather than an equality compare. An additional most significant bit may be included in the BSNs to account for the rollover of BSN assignment, and depending on the state of the most significant bits, either a greater-than or a less-than result indicates that the instruction is subsequent to the mispredicted branch instruction and thus should be cancelled. Particularly, if the most significant bits of the branch BSN and the instruction BSN are the same, a greater-than result (the BSN of the instruction is greater than the BSN of the mispredicted branch instruction) indicates that the instruction is subsequent to the mispredicted branch instruction. If the most significant bits differ, a less-than result (the BSN of the instruction is less than the BSN of the mispredicted branch instruction) indicates that the instruction is subsequent to the mispredicted branch instruction. Additionally, the instruction queue 46 may compare the BSNs of all instructions in an out of order embodiment to determine which instructions to cancel.

Turning now to FIG. 7, a first exemplary code sequence and corresponding BSN assignment is shown. The exemplary instruction sequence includes a first basic block having instructions In0, In1, and In2, terminated by a branch instruction B1 (a non-branch likely instruction). Instruction In3 is in the branch delay slot of the branch instruction. A second basic block including instructions In4, In5, and In6 is shown, terminated by a second branch instruction B2 (a non-branch likely instruction). Instruction In7 is in the branch delay slot of the second branch instruction, and the Instruction In8 is also shown.

The BSN is equal to N when instruction In0 is fetched, and thus a BSN of N is assigned to instructions In0, In1, In2, and the branch instruction B1. Additionally, since the branch instruction B1 is not a branch likely instruction and therefore the branch delay slot is unconditional, the instruction In3 is assigned a BSN of N. Subsequent instructions In4, In5, and In6 and the second branch instruction B2 are assigned the BSN of N+1 (the BSN after being incremented in response to the branch instruction B1). The instruction In7, being in an unconditional branch delay slot, is also assigned a BSN of N+1. The instruction In8 is assigned a BSN of N+2 (the BSN after being incremented in response to the second branch instruction B2).

FIG. 8 is a second exemplary code sequence and corresponding BSN assignment. The exemplary instruction sequence includes a first basic block having instructions In0, In1, and In2, terminated by a branch-likely instruction BL1. Instruction In3 is in the branch delay slot of the branch-likely instruction BL1. A second basic block including instructions In4, In5, and In6 is shown, terminated by a second branch-likely instruction BL2. Instruction In7 is in the branch delay slot of the second branch-likely instruction BL2, and the Instruction In8 is also shown.

The BSN is equal to N when instruction In0 is fetched, and thus a BSN of N is assigned to instructions In0, In1, In2, and the branch-likely instruction BL1. The branch-likely instruction BL1 indicates that the branch delay slot is conditional, and thus the instruction In3 is assigned a BSN of N+1 (the BSN after being incremented in response to the branch-likely instruction BL1). Subsequent instructions In4, In5, and In6 and the second branch-likely instruction BL2 are assigned the BSN of N+1. The instruction In7, being in an conditional branch delay slot, is assigned a BSN of N+2 (the BSN after being incremented in response to the second branch-likely instruction BL2). The instruction In8 is also assigned a BSN of N+2.

Parallel BSN Assignment

Figure 9:
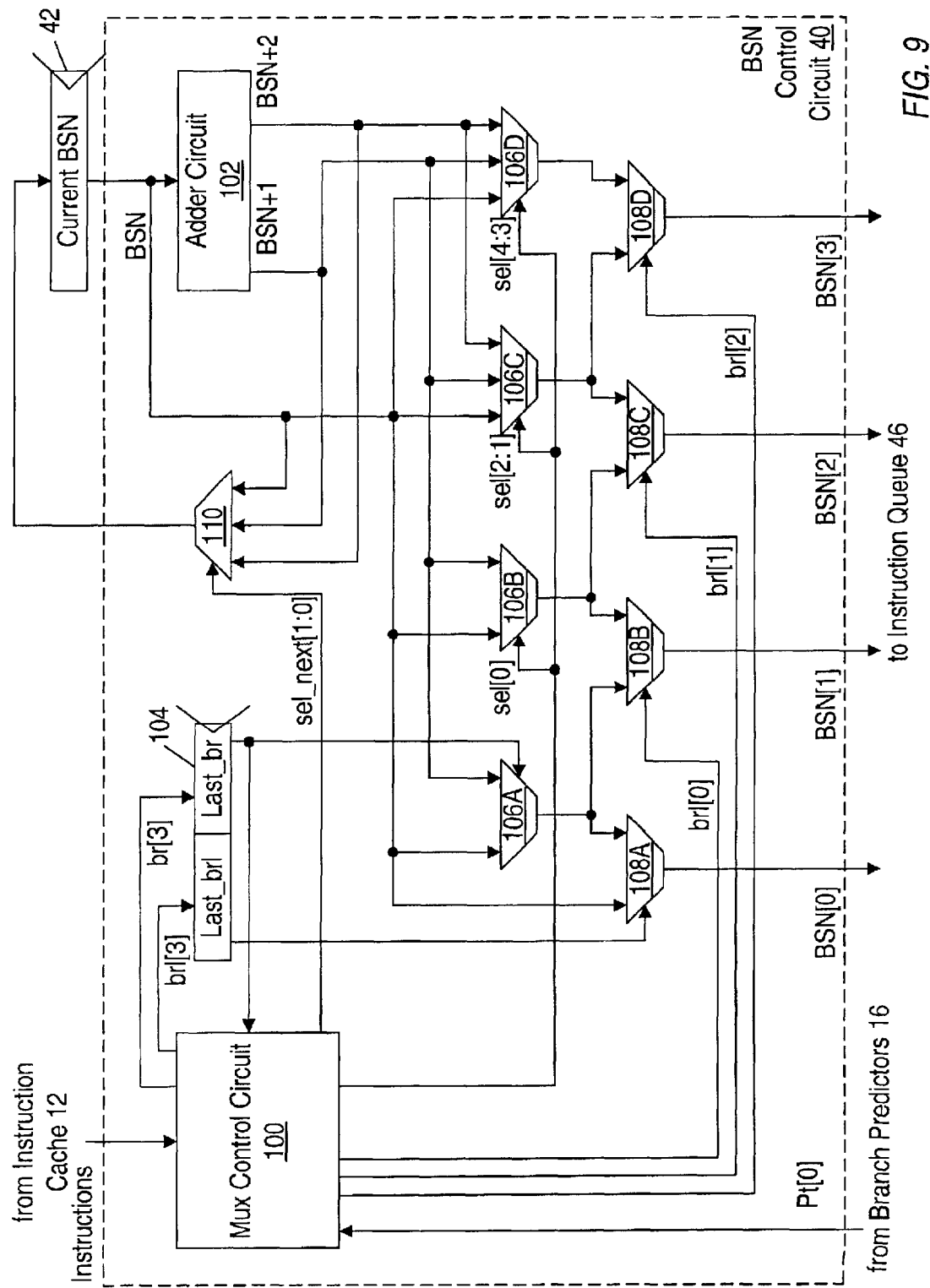
FIG. 9 is a block diagram of one embodiment of a control circuit shown in FIG. 2.
Figure 10:
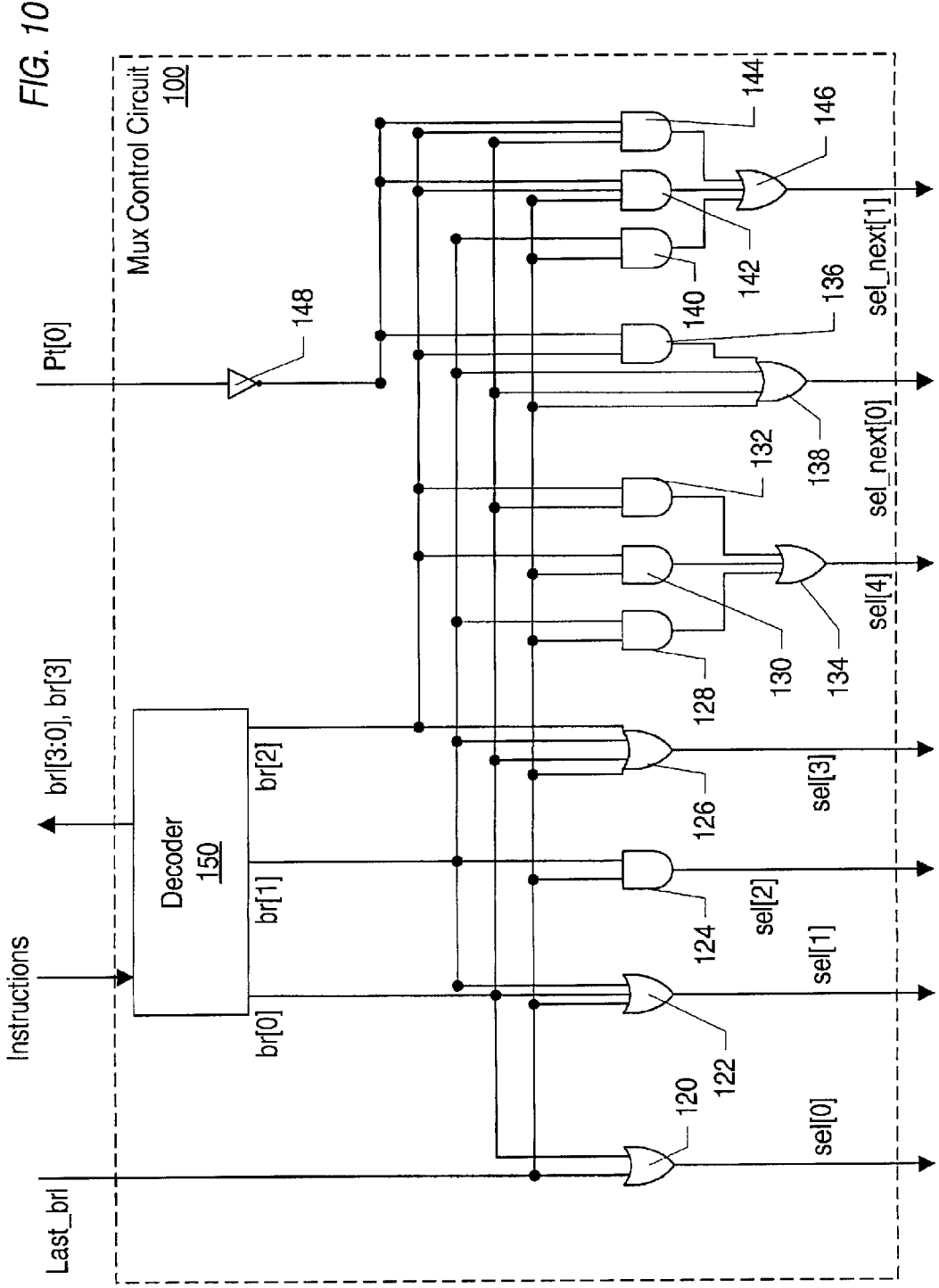
FIG. 10 is a logic diagram of one embodiment of a mux control circuit shown in FIG. 9.

As mentioned above, the BSN control circuit 40 may be configured to process multiple concurrently fetched instructions in parallel. A set of concurrently fetched instructions will be referred to more succinctly herein as a "fetch group". For example, FIGS. 9 and 10 illustrate an example in which 4 instructions (aligned to a 4 instruction boundary, e.g. 16 bytes in the MIPS architecture) form a fetch group. Generally, the BSN control circuit 40 may maintain a current BSN (in the current BSN register 42) which reflects the fetch groups previously processed by the BSN control circuit 40. The BSN control circuit 40 may unconditionally generate one or more BSNs from the current BSN (e.g. by incrementing the BSN) to create a set of BSNs for assignment to the current fetch group. Based on the cumulative number of branch instructions within the fetch group and prior to a given instruction, a BSN may be selected from the set of BSNs for assignment to the given instruction. For example, if no branches are prior to the given instruction, the current BSN is selected. If one branch is prior to the given instruction, the current BSN+1 is selected. If two branches are prior to the given instruction, the current BSN+2 is selected. Since the incremented BSNs are unconditionally generated and then selected, the assignment of a BSN for the given instruction may be independent of the assignment of a BSN for other instructions in the fetch group.

For embodiments in which the branch delay slot is implemented (e.g. the MIPS architecture), the last instruction of the most recently processed fetch group (the "previous fetch group") may also be included in selecting BSNs. In such embodiments, the instruction in the branch delay slot (if it is unconditional) may be part of the basic block including the corresponding branch instruction, and thus the basic block boundary (indicated by changing the BSN) is actually the branch delay slot. Accordingly, the current BSN in the current BSN register 42 may be calculated without regard to the last instruction in the previous fetch group, and the BSNs for instructions in the current fetch group may be assigned considering the last instruction in the previous fetch group in addition to the instructions in the current fetch group. Similarly, generation of the current BSN for the next fetch group may consider the last instruction in the previous fetch group and the branch instructions in the current fetch group, excluding the last instruction in the current fetch group.

On the other hand, if the branch delay slot is conditional, the instruction in the branch delay slot is not part of the basic block terminated by the corresponding branch instruction. In one embodiment, an initial set of BSNs may be assigned to the instructions in the current fetch group based on the number of preceding branch instructions (including the last instruction in the previous fetch group). The initial set of BSNs may be the assigned BSNs for each instruction, except for the conditional branch delay slot instruction. For the conditional branch delay slot instruction, the initial BSN assigned to the next consecutive instruction is assigned (by detecting that the instruction preceding the conditional branch delay slot instruction is of a type indicating that the delay slot is conditional, e.g. the branch likely instructions in the MIPS architecture).

FIGS. 9 and 10 illustrate an embodiment of the BSN control circuit 40 for an architecture having the branch delay slot and having the instruction in the branch delay slot conditional for certain types of branch instructions (e.g. the MIPS architecture). Additionally, the embodiment shown may handle a fetch group of 4 instructions. Other embodiments are contemplated which do not include the branch delay slot, as well as embodiments in which the branch delay slot is unconditional. Other embodiments may also handle more or fewer than 4 instructions in a fetch group.

Turning now to FIG. 9, a block diagram of a portion of one embodiment of the BSN control circuit 40 and the current BSN register 42 is shown. Particularly, the portion for assigning BSNs is shown. Other embodiments are possible and contemplated. The embodiment of FIG. 9 may be used for fetch groups of four instructions, although more or fewer instructions may be included in a fetch group in other embodiments. In the embodiment of FIG. 9, the BSN control circuit 40 includes a mux control circuit 100, an adder circuit 102, a last branch register 104, a first set of multiplexors (muxes) 106A–106D, a second set of muxes 108A–108D, and a next BSN mux 110. The mux control circuit 100 is coupled to receive instructions in a fetch group from the instruction cache 112, a branch prediction for the first instruction in the fetch group from the branch predictors 16 (Pt[0] in FIG. 9), and to the last branch register 104. Additionally, the mux control circuit 100 is coupled to provide selection controls to the muxes 110, 106B–106D, and 108B–108D. The selection controls to muxes 106A and 108A are provided from the last branch register 104. The mux 110 is coupled to the adder circuit 102 and to the current BSN register 42. Each of the muxes 106A–106D and 108A are coupled to the current BSN register 42, and the muxes 106A–106D are further coupled to the adder circuit. Each of the muxes 108A–108D are coupled to receive outputs of one or more muxes 106A–106D as shown in FIG. 9.

The adder circuit 102 receives the current BSN (labeled simply BSN in FIG. 9 and referred to below as BSN for brevity) from the current BSN register 42 and generates the BSN incremented by one (BSN+1) and the BSN incremented by two (BSN+2). The BSN is provided to each of the muxes 110, 108A, and 106A–106D. The BSN+1 is provided to each of muxes 110 and 106A–106D. The BSN+2 is provided to each of the muxes 110 and 106C–106D.

Various signals are illustrated in FIG. 9, including the br[3:0], brl[3:0], and BSN[3:0] signals. Each of these signals corresponds to one of the instructions in the fetch group, with 0 referring to the first instruction in the fetch group, 1 referring to the second instruction in the fetch group, 2 referring to the third instruction in the fetch group, and 3 referring to the fourth instruction in the fetch group. The br[3:0] and brl[3:0] signals are generated by the mux control circuit 100 in response to the instructions in the fetch group. Specifically, the br[n] signal indicates whether or not instruction "n" is a branch instruction (of any type). The brl[n] signal indicates whether or not instruction "n" is a branch likely instruction. The BSN[n] signal is the BSN assigned to instruction "n". The br[3] and brl[3] signals are provided to the last branch register 104 for storage, and are output as the last_brl and last_br signals in the next clock cycle. The last_brl and last_br signals are therefore indicative of the last instruction in the previous fetch group.

As mentioned above, the BSN control circuit 40 may assign an initial set of BSNs to the instructions in the fetch group based on the cumulative number of branch instructions prior to each instruction (including the last instruction in the previous fetch group and excluding the branch instruction immediately prior to that instruction). The initial assignment of BSNs comprises the input of the BSN from the current BSN register 42 to the mux 108A (for instruction 0), the selection of one of BSN and BSN+1 through the muxes 106A–106B for instructions 1 and 2, respectively, and the selection of one of BSN, BSN+1, or BSN+2 through the mux 106C for instruction 3. The initial assignment of BSNs assumes that the delay slot is unconditional. Accordingly, the initial BSN for each instruction is affected by the cumulative number of branch instructions prior to that instruction except for the instruction immediately prior to that instruction. For example, the initial BSN for instruction 1 is dependent on whether or not the last instruction from the previous fetch group is a branch, but not on whether instruction 0 is a branch instruction. If instruction 0 is a branch instruction, then instruction 1 is in the (assumed unconditional) branch delay slot, which is part of the basic block of the branch instruction and thus receives the same BSN as the branch instruction. The mux 106D is used to select a BSN for a hypothetical instruction 4 in the fetch group. This BSN may be used for instruction 3 if instruction 3 is in a conditional branch delay slot.

Accordingly, the selection control for the mux 106A is illustrated as the last_br signal from the last branch register 104. The mux 106A selects the BSN if the last_br signal is deasserted (indicating that the last instruction from the previous fetch group is not a branch) and selects the BSN+1 if the last_br signal is asserted (indicating that the last instruction from the previous fetch group is a branch). The selection controls for the muxes 106B–106D are generated by the mux control circuit 100 (as signals sel[4:0]). Specifically, sel[0] is the selection control for the mux 106B; the signals sel[2:1] are the selection controls for the mux 106C; and the signals sel[4:3] are the selection controls for the mux 106D. If the sel[0] signal is deasserted, the mux 106B selects the BSN. If the sel[0] signal is asserted, the mux 106B selects the BSN+1.

The muxes 106C–106D each receive the BSN, the BSN+1, and the BSN+2. The muxes 106C–106D may select the BSN by default (if neither of the select signals are asserted). The muxes 106C–106D may select the BSN+1 if the sel[1] and sel[3] signals are asserted (respectively) and the sel[2] and sel[4] signals are deasserted (respectively). Finally, the muxes 106C–106D may select the BSN+2 if the sel[2] and sel[4] signals are asserted, irrespective of the state of the sel[1] and sel[3] signals, respectively. In other words, the muxes 106C–106D may be priority select muxes where sel[2] and sel[4] take priority over sel[1] and sel[3], respectively. The sel[2] and sel[4] signals are asserted if there are two branches prior to the corresponding instruction (excluding the immediately prior instruction to the corresponding instruction). The sel[1] and sel[3] signals are asserted if there is at least one branch prior to the corresponding instruction (excluding the immediately prior instruction to the corresponding instruction). Other embodiments may encode the selections of BSN, BSN+1, and BSN+2 on the select lines or may use three select lines (one for each selection), as desired.

The BSNs received by each of the muxes 106A–106D may be based on the maximum number of branch instructions which may exist prior to the corresponding instruction. For example, in the MIPS architecture, a branch instruction may not be the instruction in the branch delay slot. Accordingly, in four instructions, at most two branch instructions may be included (where the second branch instruction is separated from the first branch instruction by the delay slot for the first branch instruction). Therefore, in the present embodiment, the BSN, BSN+1, and BSN+2 are sufficient to supply BSNs for each instruction. Embodiments which do not employ a branch delay slot may generate additional incremented BSNs for selection.

The logic equations for the sel[5:0] signals may be as follows (where "+" is a logical OR and "&" is a logical AND):

$$sel[0] = last\_br + br[0] \qquad (1)$$

$$sel[1] = last\_br + br[0] + br[1] \qquad (2)$$

$$sel[2] = last\_br \,\&\, br[1] \qquad (3)$$

$$sel[3] = last\_br + br[0] + br[1] + br[2] \qquad (4)$$

$$sel[4] = (last\_br \,\&\, br[1]) + (last\_br \,\&\, br[2]) + (br[0] \,\&\, br[2]) \qquad (5)$$

It is noted that the sel[2] and sel[4] signals (which indicate that there are two branches prior to the corresponding instruction when asserted) consider pairs of branches which are separated by at least one other instruction, since the at least one other instruction is the instruction in the delay slot if the first of the pair is a branch (and therefore the first of the at least one other instruction may not be a branch).

The muxes 108A–108D receive the initial BSNs and select a final set of BSNs for the instructions in the fetch group. The muxes 108A–108D account for the conditional delay slot. If a given instruction is in a conditional delay slot, the initial BSN for the next sequential instruction (which is in the next basic block and therefore is equal to the initial BSN of the given instruction plus one) is selected. For example, if instruction 0 is in a conditional delay slot, the initial BSN for instruction 1 (output from mux 106A) is selected. If the given instruction is not in a conditional delay slot, the initial BSN assigned to the given instruction is selected. A given instruction is in the conditional delay slot if the immediately preceding branch instruction is a branch likely instruction, as indicated by an asserted last_brl or brl[2:0] signal.

Accordingly, the mux 108A selects the BSN for instruction 0 (BSN[0]) from either the BSN (the initial BSN for instruction 0) or the output of mux 106A (the initial BSN for instruction 1) responsive to the last_brl signal. Similarly, the mux 108B selects the BSN[1] as either the output of the mux 106A (the initial BSN for instruction 1) or the output of the mux 106B (the initial BSN for instruction 2) responsive to the brl[0] signal; the mux 108C selects the BSN[2] as either the output of the mux 106B (the initial BSN for instruction 2) or the output of the mux 106C (the initial BSN for instruction 3) responsive to the brl[1] signal; and the mux 108D selects the BSN[3] either the output of the mux 106C (the initial BSN for instruction 3) or the output of the mux 106D (the initial BSN for hypothetical instruction 4) responsive to the brl[2] signal.

The next BSN mux 110 may be used to select the next BSN (to become the current BSN for the next fetch group). The next BSN may be similar to selecting the initial BSN for the hypothetical instruction 4 in the fetch group. However, the branch predictions for branches in the fetch group may also affect the generation of the next BSN. The mux control circuit 100 provides selection control signals sel_next[1:0] to select the next BSN. The next BSN mux 110 may be a priority select mux similar to the muxes 106C–106D. In other words, the next BSN mux 110 may select the BSN by default, or may select the BSN+1 if the sel_next[0] signal is asserted and the sel_next[1] signal is deasserted, or may select the BSN+2 if the sel_next[1] signal is asserted irrespective of the state of the sel_next[0] signal. As mentioned above, other embodiments may encode the selections on the sel_next signals or use three signals for the three selections.

When a branch is predicted taken, subsequent instructions within the fetch group are discarded and the target of the branch is fetched. BSNs may be assigned to instructions with the fetch group subsequent to a predicted taken branch without considering the branch prediction, since the instructions are to be discarded anyway. However, when generating the next BSN, the branch prediction may be taken into account. In one embodiment, the branch prediction for instruction 0 is used (Pt[0]). The Pt[0] signal may be asserted if instruction 0 is a branch and is predicted taken, and may be deasserted otherwise. If instruction 1 is a predicted taken branch, instruction 2 is in the delay slot and thus is not discarded. Instruction 3 does not affect the generation of the next BSN. Accordingly, the prediction for instruction 1 is not used. For similar reasons, the prediction for instruction 2 is not used.

The branch prediction for instruction 0 is used to qualify the br[2] signal in the equations for the sel_next[1:0] signals. The br[1] signal is not qualified with the branch prediction for instruction 0 since, if instruction 0 is a branch instruction, instruction 1 is in the branch delay slot and is not a branch instruction (br[1] is deasserted). The equations for the sel_next[1:0] signals may thus be (where "+" is a logical OR, "&" is a logical AND, and "!" is a logical inversion):

$$\text{sel\_next}[0] = \text{last\_br} + \text{br}[0] + \text{br}[1] + (\text{br}[2] \& \ !\text{Pt}[0]) \tag{6}$$

$$\text{sel\_next}[1] = (\text{last\_br} \& \ \text{br}[1]) + (\text{last\_br} \& \ \text{br}[2] \& \ !\text{Pt}[0]) + (\text{br}[1] \& \ \text{br}[2] \& \ !\text{Pt}[0]) \tag{7}$$

It is noted that, in one embodiment, the fetch group is aligned to a 4 instruction boundary. In such an embodiment, if the fetch group is the target of a branch instruction, one or more of the initial instructions in the fetch group may not be valid (e.g. the target of the branch may be in the middle of the fetch group). For such an embodiment, the mux control circuit 100 may qualify the generation of the br[3:0] and brl[3:0] signals with the instructions being valid to ensure the br[3:0] and brl[3:0] signals are deasserted for invalid instructions.

It is noted that, while the above description refers to assigning tags to a fetch group, other embodiments may assign tags in parallel to any group of instructions, as desired. For example, the group may be fetched at different times, and may be concurrently decoded or concurrently dispatched. Generally, any group of instructions which is in the pipeline stage that the BSN control circuit 40 operates may be processed as described above.

Turning now to FIG. 10, a block diagram of one embodiment of the mux control circuit 100 is shown. Other embodiments are possible and contemplated. In the embodiment of FIG. 10, the mux control circuit 100 includes logic gates 120, 122, 124, 126, 128, 130, 132, 134, 136, 138, 140, 142, 144, 146, and 148 and a decoder 150. The decoder 150 is coupled to receive the instructions and to decode the instructions to generate the brl[3:0] and br[3:0] signals. The brl[3:0] and br[3] signals are provided to other portions of the BSN control circuit 40 as illustrated in FIG. 9. The br[2:0] signals are provided to the logic gates 120–146 as illustrated in FIG. 10. Furthermore, the last_brl signal is provided to the logic gates 120–146 as illustrated in FIG. 10. The Pt[0] signal is provided to the inverter 148.

Generally, the logic gates 120–148 may be an example implement of the equations 1–7 above. Specifically: (i) logic gate 120 may implement equation 1; (ii) logic gate 122 may implement equation 2; (iii) logic gate 124 may implement equation 3; (iv) logic gate 126 may implement equation 4; (v) logic gates 128, 130, 132, and 134 may implement equation 5; (vi) logic gates 136, 138, and 148 may implement equation 6; and (vii) logic gates 140, 142, 144, 146, and 148 may implement equation 7.

It is noted that the logic gates 120–148 are merely an example, and any other logic circuit may be used. Specifically, Boolean equivalents of the circuits shown in FIG. 10 may be used. The illustrated circuitry may receive inputs and provide outputs which are asserted high and deasserted low. The circuitry may be modified to receive inputs and/or provide outputs which are asserted low and deasserted high, as desired.

As mentioned above, other embodiments of the BSN control circuit 40 (and the mux control circuit 100) may receive decoded signals instead of the instructions directly. In such embodiments, the decoder 150 may be eliminated and the decoded signals may be used. For example, the decode logic may provide the brl[3:0] and br[3:0] signals.

While the embodiment illustrated in FIGS. 9 and 10 handles fetch groups of four instructions, other embodiments may handle less than four instructions or more than four instructions. Each additional instruction above four may consider prior branches (and branch-likely instructions) in a manner similar to the above illustrated embodiment. Furthermore, additional BSNs may be generated by the adder circuit 102 and selected by the muxes corresponding to the additional instructions. Still further, additional branch predictions may be used to qualify generation of the next BSN if more than four instructions are handled.

It is noted that embodiments which do not have a conditional delay slot may eliminate the muxes 108A–108D and may use the outputs of muxes 106A–106C (plus the default BSN assignment to instruction 0) as the BSNs for the instructions. Furthermore, embodiments which do not have a delay slot may not exclude the instruction immediately preceding the given instruction when counting branches to select a BSN, and may not consider the last instruction of the previous fetch group.

It is noted that, while the term "branch sequence number" has been used above, generally the BSN is used as a tag in the above disclosure. As used herein, a tag is a value generated by hardware to track an instruction or group of instructions.

Figure 11:
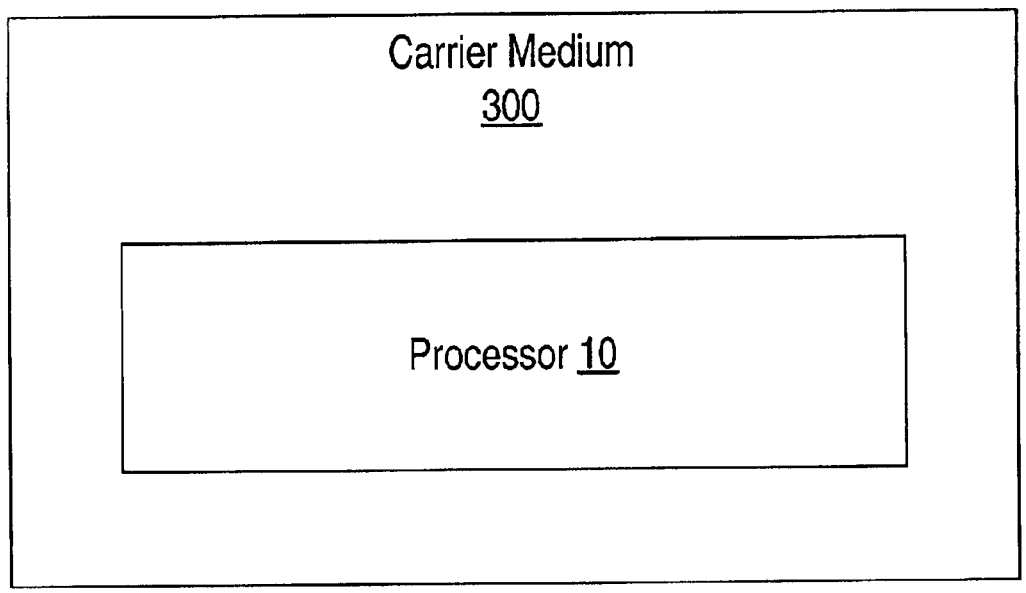
FIG. 11 is a block diagram of a carrier medium.

Turning next to FIG. 11, a block diagram of a carrier medium 300 including one or more data structures representative of the processor 10 is shown. Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link.

Generally, the data structure(s) of the processor 10 carried on carrier medium 300 may be read by a program and used, directly or indirectly, to fabricate the hardware comprising the processor 10. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description(s) to produce one or more netlists comprising lists of gates from a synthesis library. The netlist(s) each comprise a set of gates which also represent the functionality of the hardware comprising the processor 10. The netlist(s) may then be placed and routed to produce one or more data sets describing geometric shapes to be applied to masks. The masks may then be used in various semiconductor fabrication steps to produce a semiconductor circuit or circuits corresponding to the processor 10. Alternatively, the data structure(s) on carrier medium 300 may be the netlist(s) (with or without the synthesis library) or the data set(s), as desired.

While carrier medium 300 carries a representation of the processor 10, other embodiments may carry a representation of any portion of processor 10, as desired, including any set of BSN control circuits or portions thereof, instruction queues, issue logic, branch state tables, execution units, fetch/issue/decode units, execution units, branch execution circuits, pipelines, etc.

Numerous variations and modifications will become apparent to those skilled in the art once the above disclosure is fully appreciated. It is intended that the following claims be interpreted to embrace all such variations and modifications.

What is claimed is:

1. An apparatus comprising:
   a first circuit to generate a plurality of tags, each of the plurality of tags indicative of a different basic block; and
   a second circuit to select a tag from the plurality of tags for each instruction of a plurality of instructions concurrently in a pipeline stage, wherein a first tag of the plurality of tags is selected for a first instruction of the plurality of instructions responsive to a cumulative number of branch instructions prior to the first instruction within the plurality of instructions and when the first instruction is in a branch delay slot following a branch instruction, the second circuit selects the first tag for the first instruction and the branch instruction, if the branch delay slot is unconditional, but if the branch delay slot is conditional, the second circuit selects the first tag for the first instruction and a second tag from the plurality of tags for the branch instruction.

2. The apparatus as recited in claim 1 wherein when responsive to the cumulative number of branch instructions, the second circuit also includes a last instruction of a previously processed plurality of instructions in the cumulative number of branch instructions.

3. The apparatus as recited in claim 2 wherein the second circuit to select the first tag for instructions following the first instruction until a next branch instruction is encountered, if the first instruction is in the branch delay slot and the branch delay slot is conditional, but the second circuit to select a third tag for instructions following the first instruction until the next branch instruction is encountered, if the first instruction is in the branch delay slot and the branch delay slot is unconditional.

4. The apparatus as recited in claim 3 wherein the second circuit comprises:
   a first plurality of multiplexors coupled to receive the plurality of tags and to select corresponding tags for each instruction responsive to the cumulative number of branch instructions prior to each instruction for the plurality of instructions; and
   a second plurality of multiplexors coupled to receive tag outputs from the first plurality of multiplexers and to select tags for each instruction responsive to each instruction being or not being a conditional branch delay slot instruction.

5. The apparatus as recited in claim 4 wherein the conditional branch delay slot instruction is a branch likely instruction.

6. The apparatus as recited in claim 1 wherein the first circuit includes a storage device for storing a current tag currently in use and an adder circuit coupled to the storage device to generate remaining ones of the plurality of tags from the current tag.

7. The apparatus as recited in claim 6 wherein the second circuit to store one of the plurality of tags in the storage device responsive to the cumulative number of branch instructions in the plurality of instructions.

8. The apparatus as recited in claim 7 wherein the second circuit is coupled to receive an indication of a branch prediction corresponding to one or more of the branch instructions, and wherein the second circuit to select one of the plurality of tags to store in the storage device further responsive to the branch prediction.

9. The apparatus as recited in claim 8 wherein the second circuit to ignore branch instructions subsequent to a predicted-taken branch for selecting one of the plurality of tags to be stored in the storage device.

10. A method comprising:
    generating a plurality of tags, each of the plurality of tags indicative of a different basic block; and
    selecting a tag from the plurality of tags for each instruction of a plurality of instructions concurrently in a pipeline stage, the selecting the tag being responsive to a cumulative number of branch instructions prior to a respective instruction within the plurality of instructions, wherein when a first instruction is in a branch delay slot following a branch instruction, selecting a first tag for the first instruction and the branch instruction, if the branch delay slot is unconditional, but if the branch delay slot is conditional, selecting the first tag for the first instruction and a second tag from the plurality of tags for the branch instruction.

11. The method as recited in claim 10 wherein the cumulative number of branch instructions includes a last instruction of a previously processed plurality of instructions.

12. The method as recited in claim 10 further comprising:
    storing an initial tag of the plurality of tags; and
    generating remaining ones of the plurality of tags from the initial tag.

13. The method as recited in claim 12 further comprising:
    selecting one of the plurality of tags responsive to a cumulative number of branch instructions in the plurality of instructions; and
    storing the one of the plurality of tags as the initial tag.

14. The method as recited in claim 13 wherein the cumulative number excludes a last instruction of the plurality of instructions.

15. The method as recited in claim 13 wherein the cumulative number includes a last instruction of a plurality of previously processed instructions.

16. The method as recited in claim 13 wherein the selecting one of the plurality of tags is further responsive to an indication of a branch prediction corresponding to one or more of the branch instructions.

17. The method as recited in claim 12 further comprising:
    comparing tags of the first instruction in the branch delay slot and the branch instruction, if the branch instruction is mispredicted; and
    selectively canceling the first instruction responsive to the comparing.

18. The method as recited in claim 17 wherein the selectively canceling, includes canceling the first instruction if the two tags do not match and not canceling the first instruction if the two tags match.

19. The method as recited in claim 17 wherein the assigning the first tag to the first instruction occurs prior to issue of the first instruction.

20. The method as recited in claim 17 wherein the assigning the first tag to the first instruction occurs subsequent to fetch of the first instruction.

21. The method as recited in claim 17 further comprising assigning the first tag or the second tag to each instruction within a basic block terminated by the branch instruction.

22. A processor comprising:
a circuit to generate a plurality of tags, each of the plurality of tags indicative of a different basic block, and to assign a first tag to a first instruction in a branch delay slot of a branch instruction, wherein the first tag is equal to a second tag assigned to the branch instruction if the branch delay slot is unconditional, but the first tag is not equal to the second tag if the branch delay slot is conditional; and
a pipeline coupled to receive concurrently a plurality of instructions, including the first instruction with the first tag, and the first tag is to be compared to the second tag when the branch instruction is mispredicted and the first instruction is to be canceled if the first tag and the second tag are not equal.

23. The processor as recited in claim 22 wherein the circuit to assign the first tag to the first instruction prior to issue of the first instruction.

24. The processor as recited in claim 23 wherein the pipeline includes an instruction queue to queue the first instruction for issue, wherein the circuit to assign the first tag to the first instruction prior to storage of the first instruction in the instruction queue.

25. The processor as recited in claim 23 wherein the circuit to assign the first tag to the first instruction subsequent to fetch of the first instruction.

26. The processor as recited in claim 22 wherein the circuit to assign the second tag to each instruction within the basic block terminated by the branch instruction.

27. The processor as recited in claim 22 wherein the first tag is selected for the first instruction responsive to a cumulative number of branch instructions prior to the first instruction within the plurality of instructions.

28. The processor as recited in claim 27 wherein the cumulative number of branch instructions further includes a last instruction of a previously processed plurality of instructions.

29. The processor as recited in claim 28 wherein the circuit to select a third tag of the plurality of tags responsive to the cumulative number of branch instructions prior to the first instruction and to select a fourth tag for a second instruction of the plurality of instructions, the second instruction subsequent to the first instruction, and wherein the first tag is one of the third tag or the fourth tag responsive to a type of branch instruction preceding the first instruction.

* * * * *